United States Patent [19]

Chontos

[11] 4,275,504
[45] Jun. 30, 1981

[54] CUTTING SAW MEASURING ATTACHMENT

[76] Inventor: Stephen G. Chontos, West Dover, Vt. 05356

[21] Appl. No.: 144,037

[22] Filed: Apr. 28, 1980

[51] Int. Cl.³ .......................... G01B 3/10; G01B 3/08
[52] U.S. Cl. ........................................ 33/138; 33/161
[58] Field of Search .............. 33/138, 139, 161, 125 B

[56] References Cited

U.S. PATENT DOCUMENTS

| | | | |
|---|---|---|---|
| 1,730,199 | 10/1929 | Farrand | 33/138 |
| 2,484,817 | 10/1949 | Armond | 33/139 |
| 3,364,580 | 1/1968 | Lucia | 33/138 |
| 3,531,870 | 10/1970 | Romancky | 33/161 |

FOREIGN PATENT DOCUMENTS 518643 11/1955 Canada ................................ 33/161

*Primary Examiner*—Steven L. Stephan
*Attorney, Agent, or Firm*—Watson, Cole, Grindle & Watson

[57] ABSTRACT

A linear measuring instrument for attachment to a cutting saw includes a rack and pinion gear assembly for unwinding a measuring tape coiled on a rotatable drum. The pinion gears are gear coupled with the axle of the drum, and the rack gear is manually movable for rotating the pinion gears. Therefore, upon depressing the rack gear, the tape is extendable for uniformly measuring long bolts cut from a log, for example. Spaced bearings are mounted on a housing containing the drum and the tape, the bearings being in rolling engagement with the tape during the unwinding for reducing friction between the turns as the tape unwinds, and for otherwise confining the tape within the housing. A variable limit stop arrangement is provided for limiting the extent of rack gear movement and thus limiting the extent of the tape unwound from the housing so that log bolts of different uniform lengths may be cut. And, the attachment may be mounted on the cutting saw for effecting either a diagonal cut or a straight cut of the log bolts.

14 Claims, 6 Drawing Figures

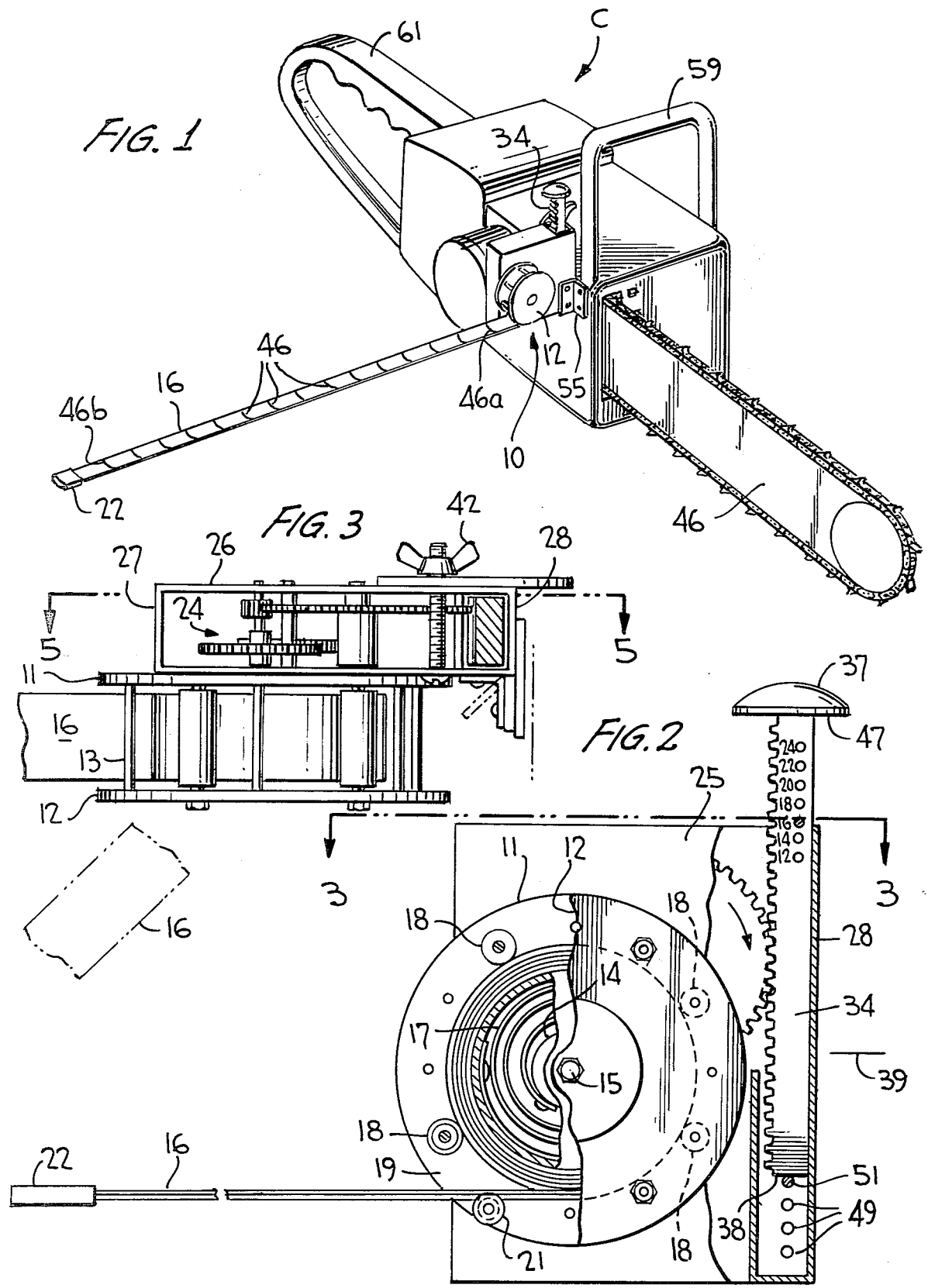

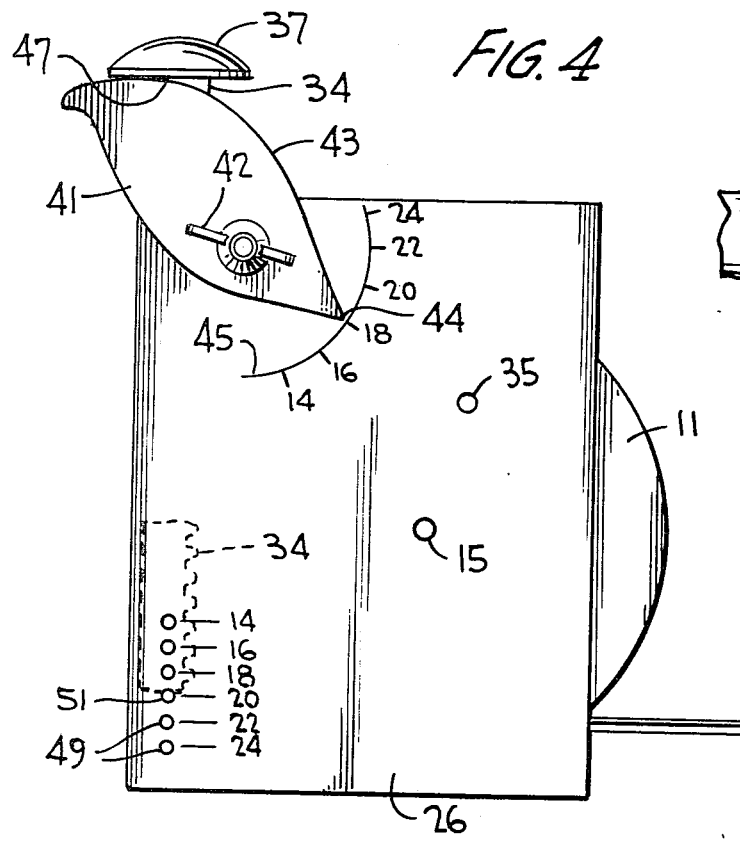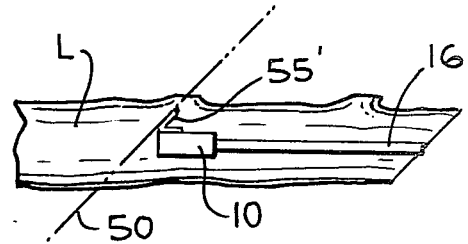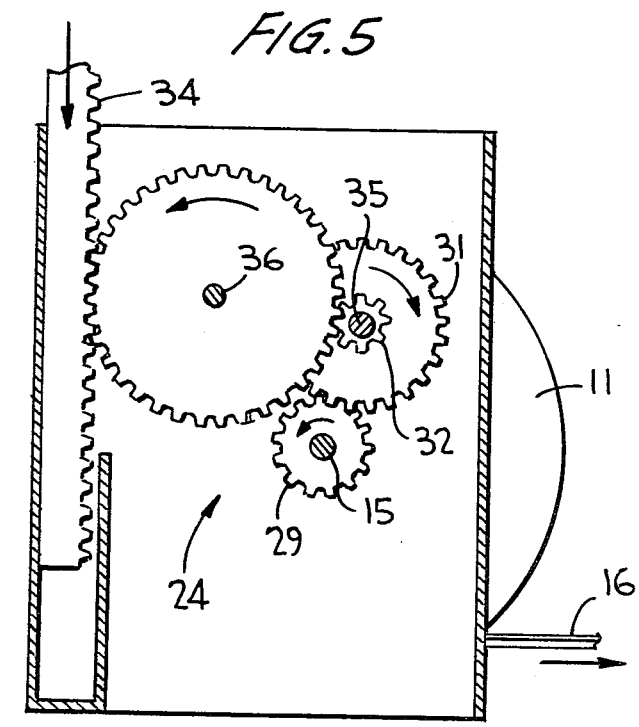

CUTTING SAW MEASURING ATTACHMENT

BACKGROUND OF THE INVENTION

This invention relates to a device for uniformly measuring log bolts to be cut from a log, for example, and is adapted for attachment to a cutting saw such as a chain saw. More particularly, the device includes a rack and pinion gear assembly for unwinding the coiled tape from a drum, the pinion gears being gear coupled with the drum axle. And, rollers engage the turns of the tape during unwinding for reducing friction between the turns. Some known chain saw measuring devices include the use of rigid rods of a predetermined length, although such devices are limiting in that rods of different lengths must be substituted each time log bolts of different sizes are to be cut. Besides, these devices are cumbersome and may present a safety hazard during the handling and operation of the chain saw. Other known measuring devices include the use of a flexible tape which must be manually uncoiled and hooked onto the end of the log to be cut. It is apparent that use of such other devices is likewise cumbersome, unsafe and of limted design. A further known measuring instrument includes a measuring tape coiled on a drum, the tape being unreeled and reeled by a drive selectively coupled with the chain saw motor. Such a device, however, is not only cumbersome but is not adaptable for attachment to a conventioal chain saw.

SUMMARY OF THE INVENTION

It is therefore an object of the present invention to provide a measuring attachment for a cutting saw which is not only easy to operate and simple in its construction, but is economical to manufacture and can be fitted to any existing cutting saw, such as a chain saw, without the need to adapt the saw thereto in any manner.

The cutting saw attachment according to the invention includes a measuring tape coiled onto a drum located in a housing and extending through an outlet of the housing for making length measurements. The drum has a central axle extending through a wall of the housing and is gear coupled with the pinion gears of a rack and pinion gear assembly. The rack gear of this assembly is manually depressable for turning the drum and thereby unreeling the tape to a desired measuring extent. The length of the unreeled tape may be varied by the provision of a limit stop arrangement which limits the extent of rack gear movement so that a selected length can be cut from the log. Measured length indicia is provided for indicating the length of the log bolts to be cut. Idler rollers surrounding the wound tape function to confine the tape during rewinding and to engage the turns of the coiled tape during unwinding for reducing friction between the turns. Also, the present device may be attached to a chain saw for effecting either diagonal or straight cuts of the log bols.

Other objects, advantages and novel features of the invention will become more apparent from the following detailed description of the invention.

BRIEF DESCRIPTION OF THE DRAWINGS

FIG. 1 is a perspective view of the measuring attachment according to the invention shown mounted on a conventional chain saw;

FIG. 2 is an enlarged side elevation, partly broken away, of the measuring attachment of FIG. 1;

FIG. 3 is a view taken substantially along line 3—3 of FIG. 2;

FIG. 4 is a rear plan view of the measuring attachment shown in FIG. 2;

FIG. 5 is a view taken along lie 5—5 of FIG. 3; and

FIG. 6 is a top plan view schematically illustrating the manner in which diagonal log bolt cuts are made.

DETAILED DESCRIPTION OF THE INVENTION

Turning now to the drawings wherein like reference characters refer to like and corresponding parts throughout the several views, a measuring attachment, generally designated 10 in FIG. 1, is shown mounted on a conventional chain saw C. The attachment includes a housing comprised of a pair of spaced plates 11 and 12 which may be interconnected by a plurality of pins 13. A cylindrical seat element 14 is affixed to plate 11 in some suitable manner, and has a central opening through which an axle 15 extends. A drum 20 has a wall 20a containing a central opening coaxial with the opening of element 14 through which axle 15 likewise extends. A coil return spring 17 is anchored at opposite ends respectively to the outer surface of element 14 and to the inner cylindrical surface of drum 20 (FIG. 2). The drum is located between plates 11, 12 and is mounted on axle 15 for rotation therewith. A flexible measuring tape 16 of the standard variety is coiled about the drum, an inner end thereof being affixed to the outer cylindrical surface of the drum. A plurality of spaced idler rollers 18 are mounted for free rotation about the wound type to confine the tape during rewinding and to engage the turns of the tape during unwinding for reducing friction between the turns. An outlet opening 19 of the housing is defined between one of the rollers 18 and another idler roller 21 (which may be of concave shape) through which the measuring tape extends during unwinding and rewinding as it bears against roller 21. An end piece 22 is provided at the terminal end of the tape in the customary manner.

A casing 23, which contains a rack and pinion gear assembly 24, comprises a pair of spaced side walls 25, 26 interconnected by a pair of spaced end walls 27, 28. Wall 25 abuts against and is mounted on wall 11 of the tape housing.

Gear assembly 24 includes a plurality of pinion gears 29, 31, 32 and 33 in toothed engagement with one another as shown in FIG. 5, gear 29 being mounted on axle 15 (which extends through plate 11 and wall 25) for rotation therewith. And, a rack gear 34 is in toothed engagement with the largest pinion gear 33. Pinion gears 31 and 32 are mounted on an axle 35, and gear 33 is mounted on an axle 36, both axles spanning sidewalls 25, 26 of casing 24. As seen in FIG. 1, rack gear 34 extends partially outwardly of casing 24, and has a pushbutton cap 37 (FIGS. 2 and 4) at its outer terminal end. During a completely wound condition of the tape, an inner terminal end 38 of the rack bar will lie at approximately a position 39 shown in FIG. 2. Thus, upon a manual depression of the rack gear, it will be lowered to its position shown in FIGS. 2 and 5 to thereby rotate the pinion gears which cause drum 20 to rotate in a clockwise direction of FIG. 2 to thereby unreel the tape to a predetermined measuring position shown in FIGS. 1 and 2. Release of manual pressure against the rack bar thereafter allows the tape to return to its fully coiled position on the drum under the action of return spring 17.

A further feature of this invention includes the provision of a means for limiting the extent of tape unreeled from its casing so that log bolts of 12, 14, 16 inches, etc., may, if desired, by precisely measured for cutting by the chain saw. According to one aspect of the invention, such a limiting means comprises a cam element 41 mounted on sidewall 26 of casing 24 by means of a bolt and wing nut 42 arrangement (see FIGS. 3 and 4). The cam element is mounted concentrically, has an upper cam edge 43 and a pointer 44 at one end. Indicia, such as spaced markings 14 through 24, is applied along a curved line 45 to the outer surface of the side wall 26. This curved line describes an arc about the turning axis of the wing nut and markings 14 to 24 are spaced apart and are correlated with the configuration of the cam edge 43 for limiting the unreeled exent of the tape in accordance with one of the selected measurements. Thus, if it is desired to cut a log bolt of, for example, 18 inches long from a log, the operator simply loosens wing nut 42 and rotates cam element 41 until its pointer 44 coincides with marking 18, as shown in FIG. 4. The rack bar is then manually depressed until undersurface 47 of cap 37 impacts against cam edge 43. The rack and pinion assembly thus functions to rotate drum 20 in a clockwise direction of FIG. 2 to thereby unwind the tape until, marking 46a thereon (representing 18 inches) is exposed directly beneath the tape housing. Markings 46 are so disposed on the tape as to give an accurate measurement of 18 inches. Thus, the marking must take into account the overall width of the attachment between end wall 28 and the outer edges (to the left in FIG. 2) of walls 11, 12 plus the distance from wall 28 to cutting line 50 produced by saw 48. In other words, if the distance between marking 46a and the cutting line produced by chain saw 48 is equal to three inches, markings 46 are so numbered to take this into account so as to assure an accurate reading of marking 46a as 18 inches in the example given.

Another limit stop arrangement provided for the rack bar includes the provision of a series of holes 49 is sidewall 26 located in the path of travel of the rack bar. Insertion of a pin 51 through a selected one of these holes therefore provides a limit stop as inner terminal end 38 of the rack bar is brought to bear thereagainst upon a manual depression of the bar. Thus, with pin 51 in place as shown in FIGS. 2 and 4, the rack bar may be depressed a distance equal to that shown by the marking identifying the pin location. In this example, pin placement is as the 18 inch marking. and, the spaced markings are correlated with the extent of downward travel of the rack bar required to unwind a selected length tape.

A further limit stop arrangement, shown in FIG. 2, is provided by a series of holes 52 extending through the rack bar and lying parallel to end wall 28. These holes are similarly identified to those described with reference to FIG. 4 in that they are designed to limit the downward travel of the rack bar corresponding to the selected length of tape to be unwound. A removable pin 53 may be inserted through a selected one of holes 52, such pin bearing against the upper edge of sidewall 25 during inward movement of the rack bar for limitng the length of unwound tape to the selected measurement to be made.

Measuring attachment 10 of the invention is mounted to the chain saw casing 54 by means of an angle bracket 55 or the like. One leg of the bracket is secured to wall 25 and the other leg is mounted on casing 54 using the same fastener provided for mounting handle 59 in place. Thus, such fastener is simply removed and reapplied after the bracket leg is placed over the terminal end of the handle leg (see FIG. 3). The opposite handle leg remains mounted in place on casing 54.

Bracket 55 is shown in FIG. 3 as a right-angle bracket so that the axis of the unwound tape lies perpendicular to cutting line 50 for effecting straight log bolt cuts.

On the other hand, a bracket 55' may be used for mounting the measuring attachment, such bracket having its legs lying at an acute angle to one another (shown in phantom outline in FIG. 3). Thus, the axis of tape 16 (also shown in phantom outline in FIG. 3), when unwound, will lie at an acute angle to cutting line 50. Diagonal cuts of log L may therefore be effected as illustrated in FIG. 6. Of course, measurement markings 46 may need to be adjusted for the tape made available for a diagonal cut because of the hypotenuese side of the angle being measured.

From the foregoing, it can be seen that a measuring attachment for a cutting saw, especially a chain saw, has been devised for operation in a simple manner with the use of few parts and without the need for special adaptation to existing chain saws. The operator simpley grasps handle 59 of chain saw C with his left hand while grasping the control handle 61 with his right hand. This leaves the operator's left thumb free for conveniently depressing the rack bar after selecting the length desired for the log bolts to be cut. Such a selection is made by means of cam element 43, pin 51 or pin 53. The rack bar is then depressed and a predetermined length of the tape is unwound for determining uniform lengths of log bolts to be cut.

Obviously, many modifications and variations of the present invention are made possible in the light of the above teachings. It is therefore to be understood that within the scope of the appended claims, the invention may be practiced otherwise than as specifically described.

What is claimed is:

1. A measuring attachment for cutting saws, comprising a housing having an outlet, a flexible tape coiled onto a drum in said housing and extendible through said outlet for making length measurements, said drum being mounted on a central axle for rotation therewith, means for unwinding said tape upon rotation of said drum in a first direction, said means comprising an assembly of rack and pinion gears wherein said pinion gears are gear coupled with said axle for rotating said drum in said first direction, said rack gear being disposed for manual movement in one direction for rotating said pinion gears, whereby said tape may be unwound a predetermined extent through said outlet upon movement of said rack gear.

2. The attachment according to claim 1, wherein a plurality of spaced anti-friction bearings are mounted on said housing in rolling engagement with said tape during the unwinding thereof for reducing friction between the turns of the tape during unwinding.

3. The attachment according to claim 2, wherein a return spring is operatively mounted within said drum for rewinding said tape thereon upon a release of said rack gear allowing it to move in an opposite direction, said bearings engaging said tape also during the rewinding thereof for confining said tape within said housing.

4. The attachment according to claim 1, wherein a casing is provided for containing said assembly, said rack gear projecting partially outwardly of said casing to facilitate manual movement thereof.

5. The attachment according to claim 4, wherein means are provided for limiting movement of said rack gear in said one direction to thereby limit the extent of said tape outwardly of said outlet, said limiting means comprising an adjustable limit stop on said casing in the path of travel of said movable rack gear, and an abutment surface on said rack gear which engages said limit stop during movement in said one direction.

6. The attachment according to claim 5, wherein said limit stop comprises a cam element having an outer cam surface, and said rack gear having a cap on an outer terminal end thereof, said pushbutton having a undersurface comprising said abutment surface.

7. The attachment according to claim 5, wherein said limit stop comprises a stop pin, and an inner terminal end of said rack gear comprising said abutment surface.

8. The attachment according to claim 6, wherein cam element is mounted for rotation about an eccentric axis on said casing, length measurement indicia being provided on said casing, and said cam element having a pointed end cooperating with said indicia for indicating the length measurement of said tape.

9. The attachment according to claim 7, wherein a series of holes are provided in said casing in alignment with said rack gear and being spaced apart distances corresponding to length measurement increments of said tape, indicia provided on said casing for indicating said increments, and said stop pin extending through a selected one of said holes.

10. The attachment according to claim 4, wherein means are provided for limiting movement of said rack gear in said one direction to thereby limit the extent of said tape outwardly of said outlet, said limiting means comprising an adjustable limit stop on said rack bar and an abutment on said casing which engages said limit stop during movement in said one direction.

11. The attachment according to claim 10, wherein said limit stop comprises a stop pin, and an outer end of said casing comprising said abutment.

12. The attachment according to claim 11, wherein a series of holes are provided in said rack bar at spaced apart distances corresponding to length measurement increments of said tape, indicia provided on said rack bar for indicating said increments, and said stop pin extending through a selected one of said holes.

13. The attachment according to claim 1, wherein a casing is provided for containing said gear assembly, said axle extending into said casing through a wall thereof, and means on said casing for mounting the attachment on a cutting saw so that said tape when extended lies perpendicular to the cutting direction of the saw.

14. The attachment according to claim 1, wherein a casing is provided for containing said gear assembly, said axle extending into said casing through a wall thereof, and means on said casing for mounting the attachment on a cutting saw so that said tape when extended lies at an acute angle to the cutting direction of the saw.

* * * * *